US007249566B1

(12) United States Patent
Kyle

(10) Patent No.: US 7,249,566 B1
(45) Date of Patent: Jul. 31, 2007

(54) HATCH ASSEMBLY

(75) Inventor: James H. Kyle, Keene, NH (US)

(73) Assignee: Pompanette, Inc., Charlestown, NH (US)

( * ) Notice: Subject to any disclaimer, the term of this patent is extended or adjusted under 35 U.S.C. 154(b) by 0 days.

(21) Appl. No.: 11/161,800

(22) Filed: Aug. 17, 2005

(51) Int. Cl.
*B63B 19/14* (2006.01)

(52) U.S. Cl. ............................................... 114/201 R

(58) Field of Classification Search ............. 114/201 R
See application file for complete search history.

(56) References Cited

U.S. PATENT DOCUMENTS

| | | | |
|---|---|---|---|
| 5,676,082 A | 10/1997 | Kyle | 114/201 |
| 5,941,190 A | 8/1999 | Kyle | 114/201 |
| 6,105,529 A | 8/2000 | Kyle | 114/201 |
| 6,186,357 B1 | 2/2001 | Kyle | 220/841 |
| 6,460,902 B1 * | 10/2002 | Kyle | 292/165 |

* cited by examiner

*Primary Examiner*—Stephen Avila
(74) *Attorney, Agent, or Firm*—Simpson & Simpson, PLLC

(57) ABSTRACT

A hatch generally includes a hatch lid frame having a fixed opening defining a perimeter, a lens having a lens perimeter smaller than the opening perimeter such that the lens is insertable into the opening, and a gasket disposed between the hatch lid frame and the lens. The lens asserts a force upon the gasket to sealably secure the lens within the hatch lid frame. A method of securing a lens within a hatch lid frame generally includes inserting the lens into an opening of the hatch lid frame, asserting a force upon the lens to direct the lens in a direction, inserting a gasket between the lens and a perimeter of opening, and de-asserting the force applied to the lens to sealably secure the lens within the hatch lid frame.

21 Claims, 11 Drawing Sheets

HATCH ASSEMBLY

FIELD OF THE INVENTION

The present invention relates to hatches, and more particularly, to an improved hatch and method of manufacturing the same.

BACKGROUND OF THE INVENTION

Hatches, particularly hatches for boats, are fairly well known devices that allow ingress and egress into and out of enclosed areas, e.g., boat cabins, and/or allow light to enter an enclosed area. Hatches, thus, generally comprise assemblies that allow the hatch to be open and closed and may also comprise lenses, which are typically translucent or transparent. Generally, the lenses of hatches are secured within the framework of a hatch lid by means of elastomeric adhesives, such as silicone or urethane caulks. Silicone caulks are generally preferred because they tend to be more resistant to the effects of UV light when compared with other adhesives. Silicone caulks also maintain the bond between the lens and lid frame despite the expansion or contraction of the lens or frame when subject to heating and cooling. Consequently, the failure to use an appropriate adhesive can result in failure of the seal between the lens and the lid frame, which can result in leakage.

Since hatches are often mounted horizontally, it is important to ensure that the lens is substantially flush mounted with the lid frame and is not mounted below the lid frame when a hatch is constructed. Flush mounting of the lens prevents pooling of water and avoids presenting safety hazards to crewmembers, e.g., tripping hazards due to uneven hatch surfaces. One method of flush mounting a lens includes placing a gasket about a flange of a lid frame, setting the lens upon the gasket such that the top surface of the lens is even with the lid frame and a channel is formed between the lid frame and the perimeter of the lens, masking off portions of the lens and the frame to prevent adhesive from adhering to surfaces, inserting adhesive into the channel, troweling the adhesive so that it is flush with the lens and lid frame, and then allowing the caulking to cure for a period of time, typically between two and three days. Another method of constructing a hatch having a flush mounted lens includes fastening two ends of a two part lid frame together about the lens wherein the lens has a gasket disposed about its perimeter. While the two part hatch frame method is sufficient to form a hatch, the method requires that the components of the hatch, e.g., frame, lens, and gasket, be manufactured to very precise tolerances for proper mating fit. Thus, such hatches can be difficult to manufacture and assemble and can be expensive. Another method of manufacturing a hatch can include applying a glazing to cover the seal between the lens and lid frame, but such methods can produce uneven surfaces and result in the pooling of water.

What is needed, then, is a more efficient method to manufacture an improved hatch having a flush mounted lens, which overcomes these, and other, disadvantages.

SUMMARY OF THE INVENTION

A hatch according to the present invention generally comprises a hatch lid frame having a fixed opening defining a perimeter, a lens having a lens perimeter smaller than the opening perimeter such that said lens is insertable into the opening, and a gasket disposed between the hatch lid frame and the lens. The lens asserts a force upon the gasket to sealably secure the lens within the hatch lid frame. A method of securing a lens within a hatch lid frame generally includes inserting the lens into an opening of the hatch lid frame, asserting a force upon the lens to direct the lens in a direction, inserting a gasket between the lens and a perimeter of opening, and de-asserting the force applied to the lens to sealably secure the lens within the hatch lid frame.

It is therefore an aspect of the present invention to provide an improved hatch.

It is another aspect of the present invention to provide a hatch wherein a gasket is disposed between a hatch lid frame and a lens.

It is still yet another aspect of the invention to provide a hatch wherein a lens is configured to assert a force upon a gasket such that the lens may be sealed with respect to a hatch lid frame.

It is still another aspect of the invention to provide a method for manufacturing a hatch.

It is still another aspect of the invention to provide a method for manufacturing a hatch wherein a force is asserted upon a lens to allow a gasket to be inserted between a hatch lid frame and the lens and the force de-asserted to wedge the gasket between the hatch lid frame and lens.

These and other aspects, features, and advantages of the present invention will become readily apparent to those having ordinary skill in the art upon reading the following detailed description of the invention in view of the several drawings of the invention.

BRIEF DESCRIPTION OF THE DRAWINGS

The nature and mode of operation of the present invention will now be more fully described in the following detailed description of the invention in view of the accompanying drawing figures, in which.

DETAILED DESCRIPTION OF THE INVENTION

At the outset, it should be appreciated that while the present invention is described with respect to what is presently considered to be the preferred embodiments, the invention is not limited to the embodiments specifically recited herein. In the detailed description that follows like drawing numbers on different drawing views are intended to identify identical structural elements of the invention.

Figure 1:
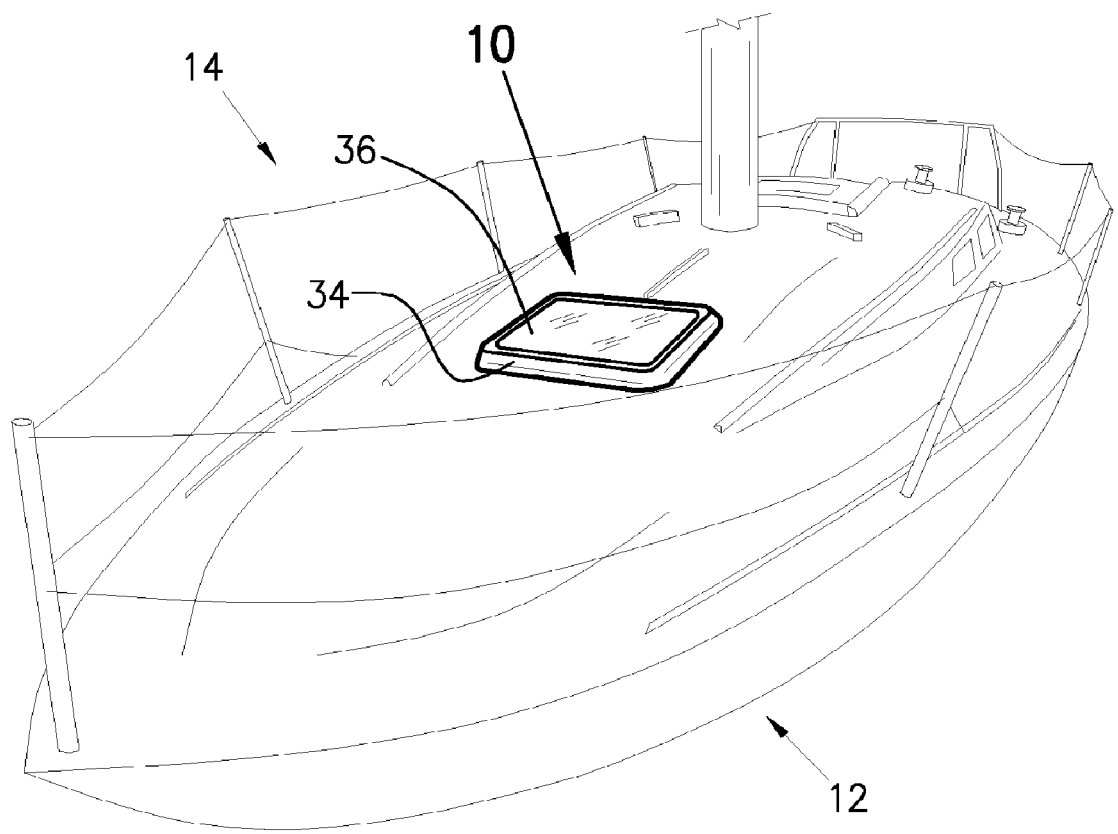
FIG. 1 illustrates a hatch according to the invention secured to a sailboat.
Figure 2:
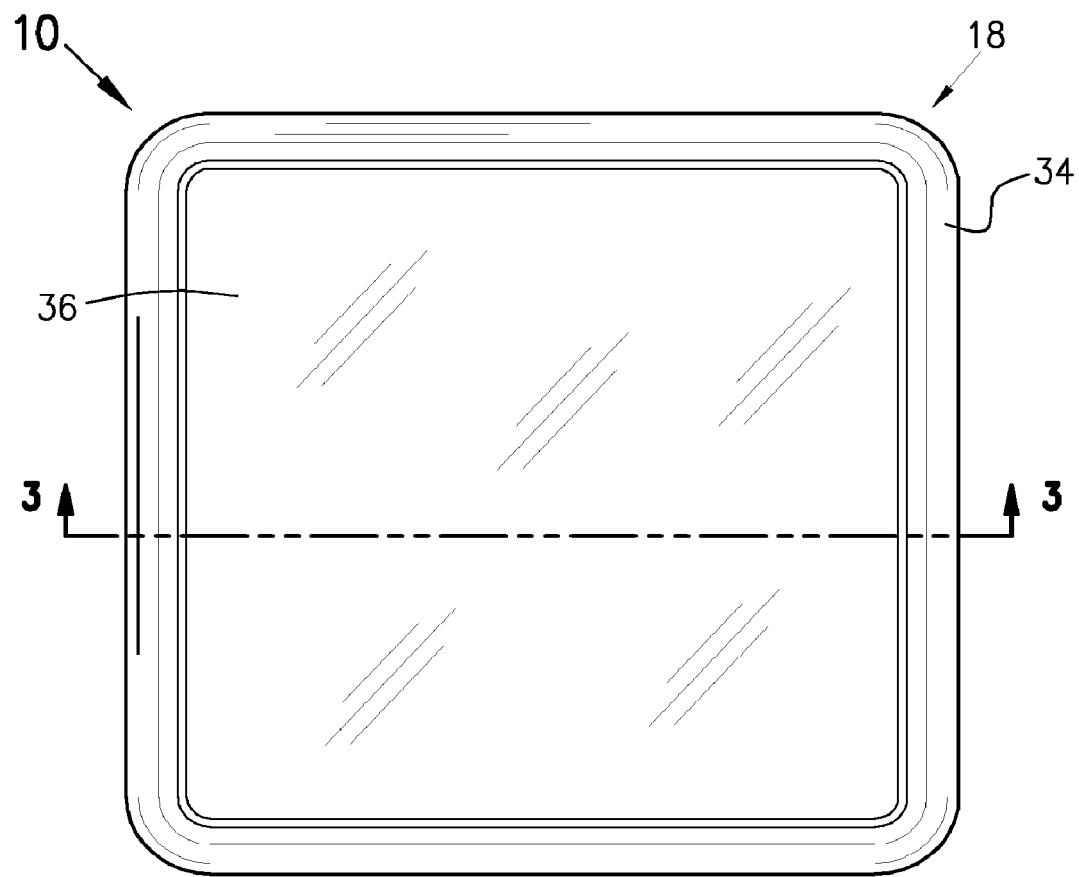
FIG. 2 is a top view of a hatch according to the invention.
Figure 3A:
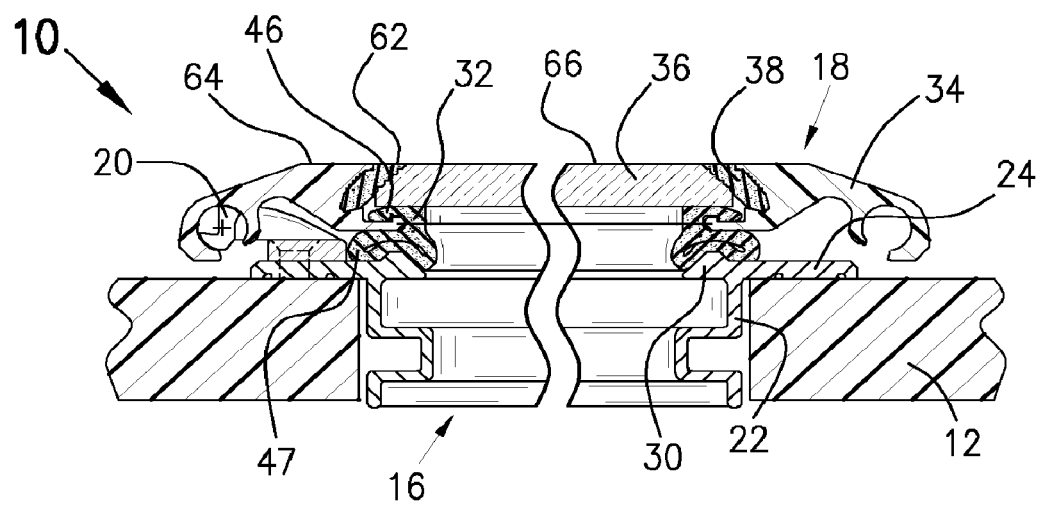
FIGS. 3a, 3b and 3c are cross-sectional views of a hatch according to the invention, taken generally along line 3—3 of FIG. 2, illustrating the hatch in a closed, partially open and open position, respectively.
Figure 3B:
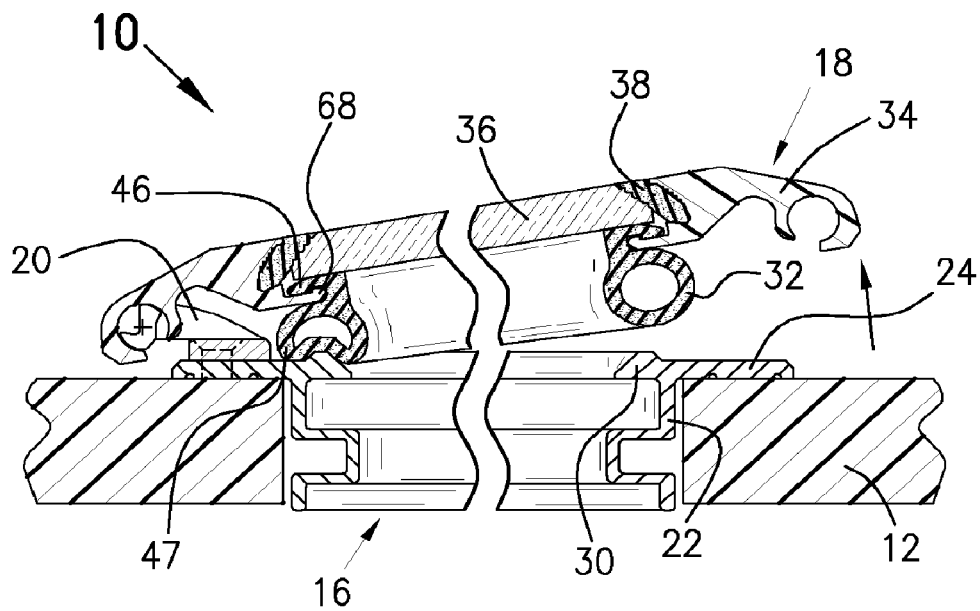
Figure 3C:
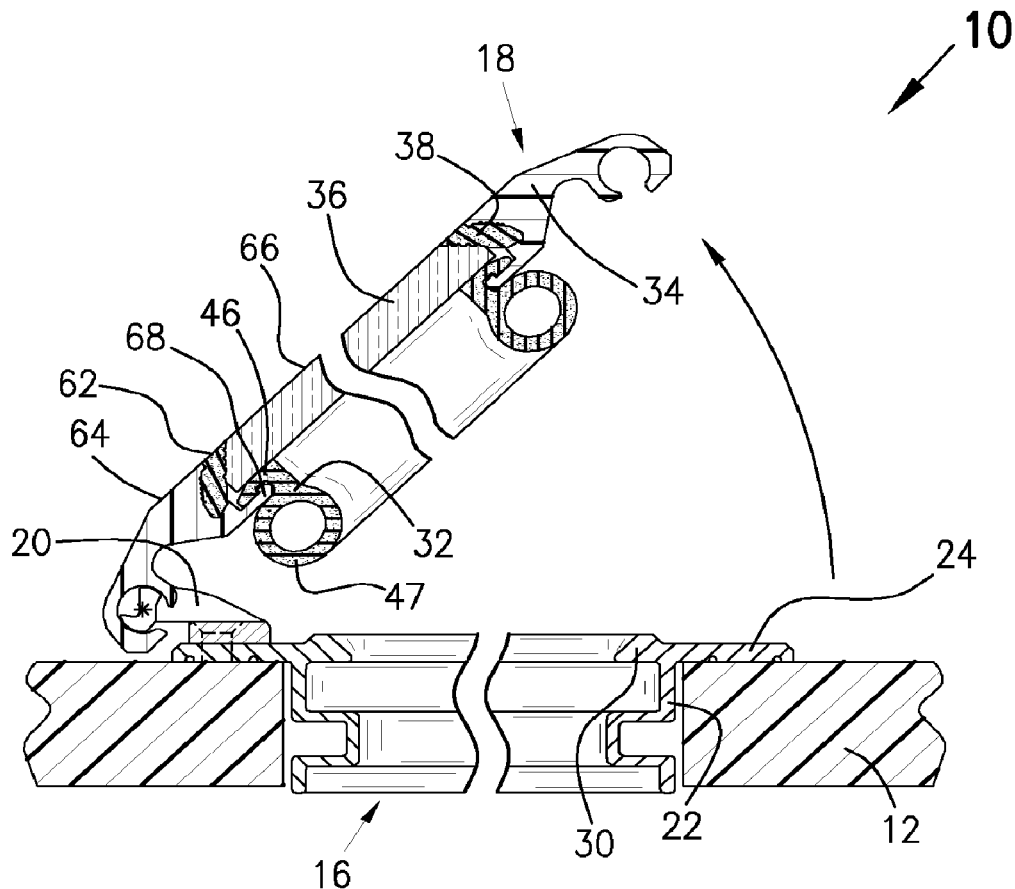
Figure 4A:
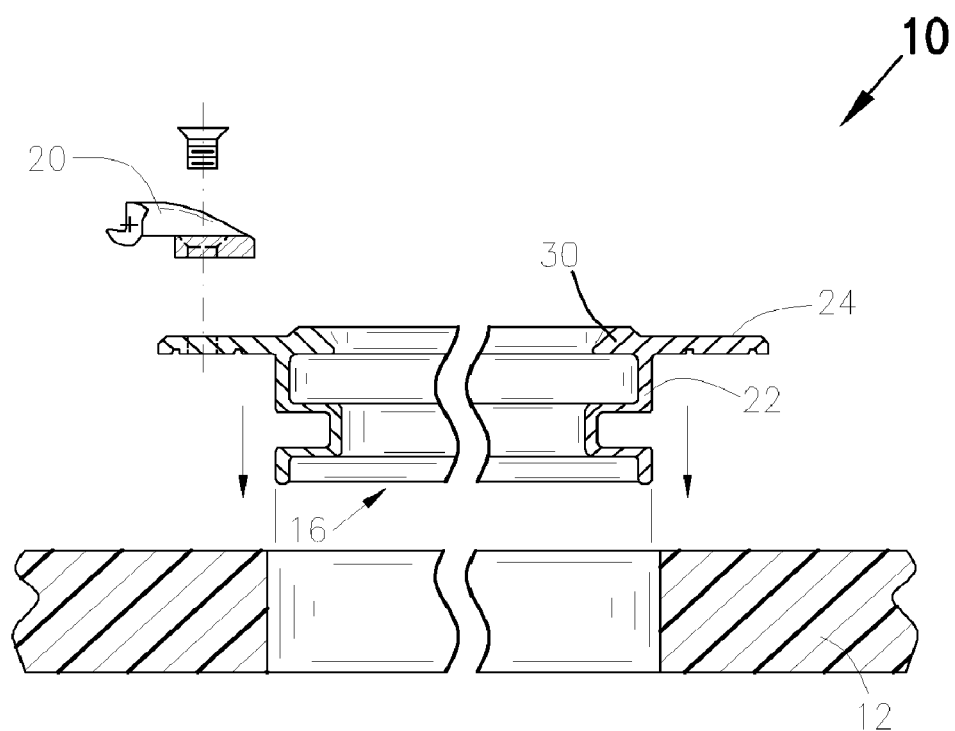
FIGS. 4a–4d are cross-sectional exploded views of a hatch according to the invention with the hatch lid removed, taken generally along line 3—3 of FIG. 2, illustrating securing the hatch to a substrate.
Figure 4B:
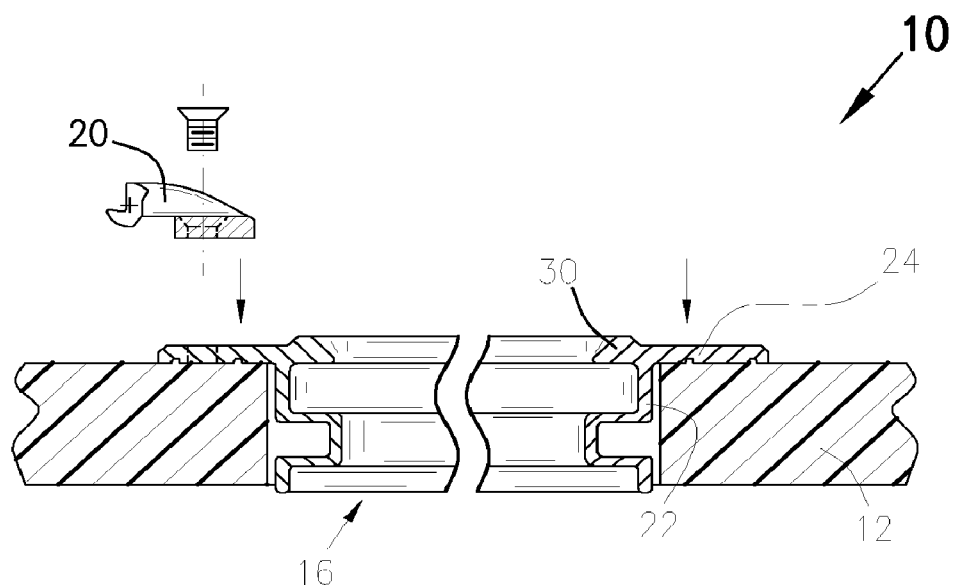
Figure 4C:
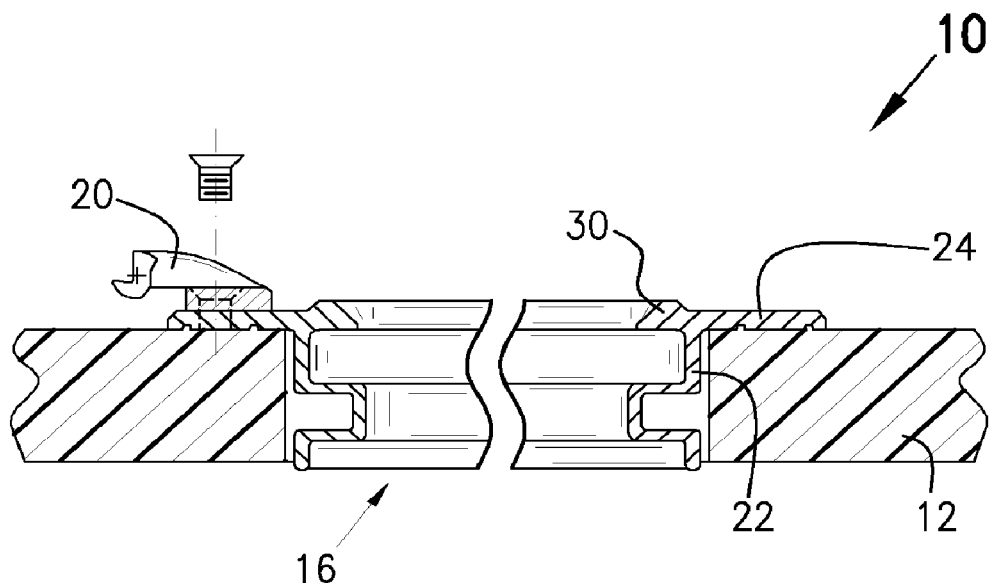
Figure 4D:
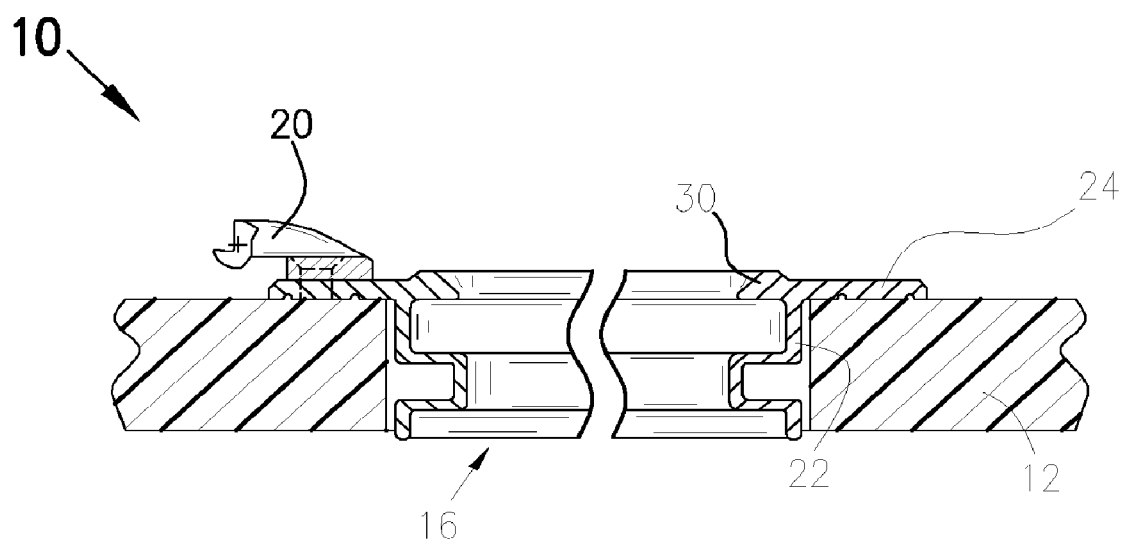
Figure 5A:
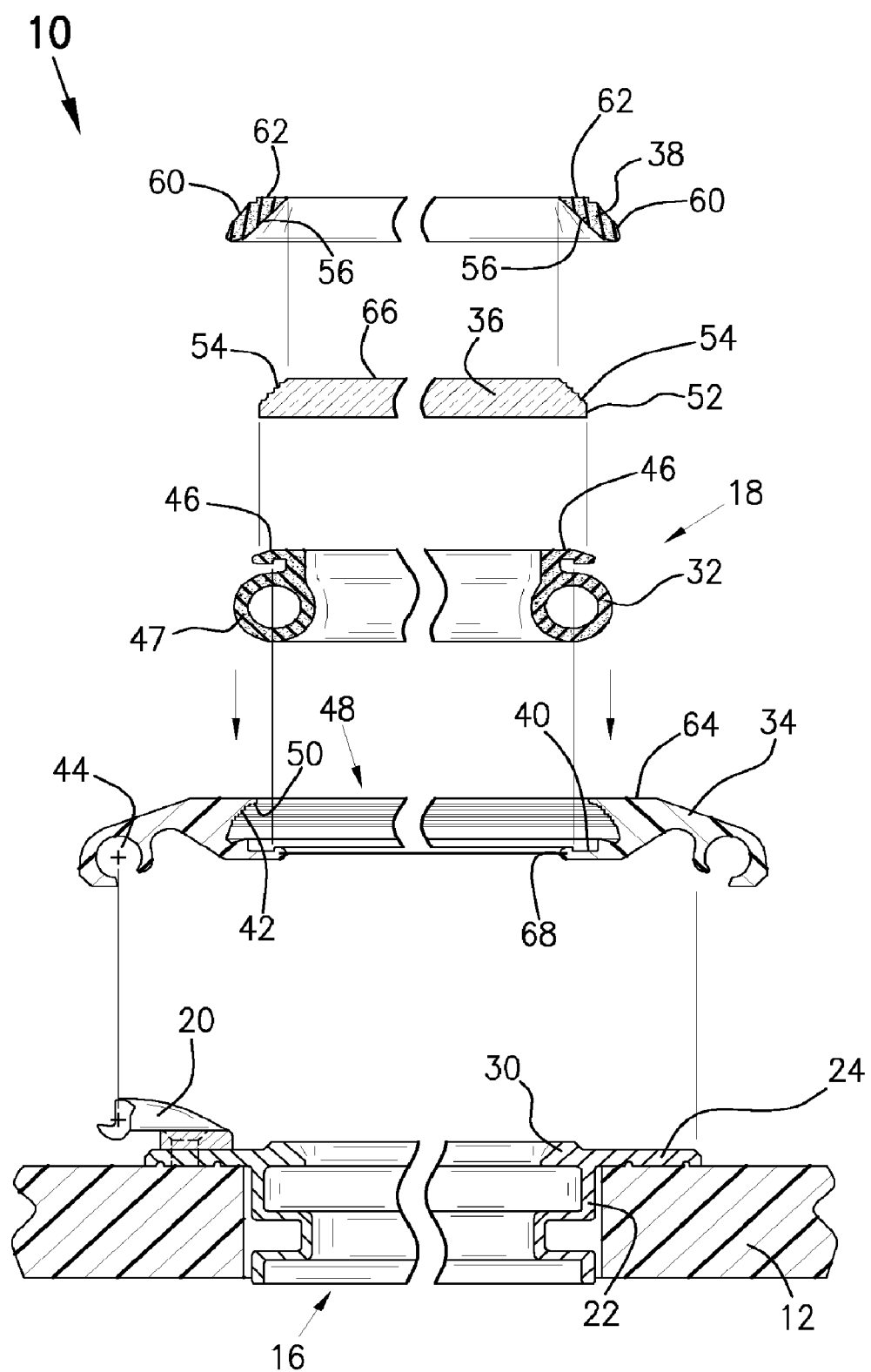
FIGS. 5a–5g are exploded views of a hatch according to the invention taken generally along line 3—3 of FIG. 2, illustrating fabrication of a hatch; and, FIGS. 6–9 are partial close-up views of a hatch according to the invention illustrating the hatch lid frame, gasket and lens interfaces.
Figure 5B:
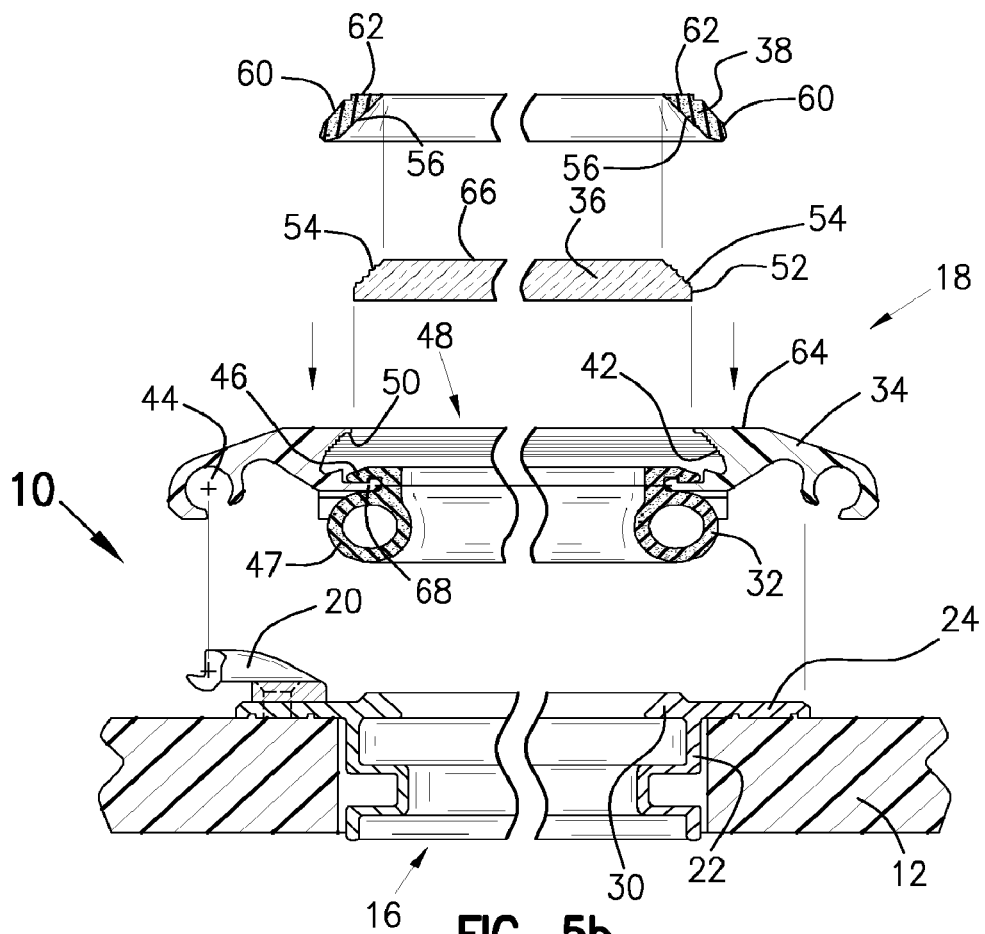
Figure 5C:
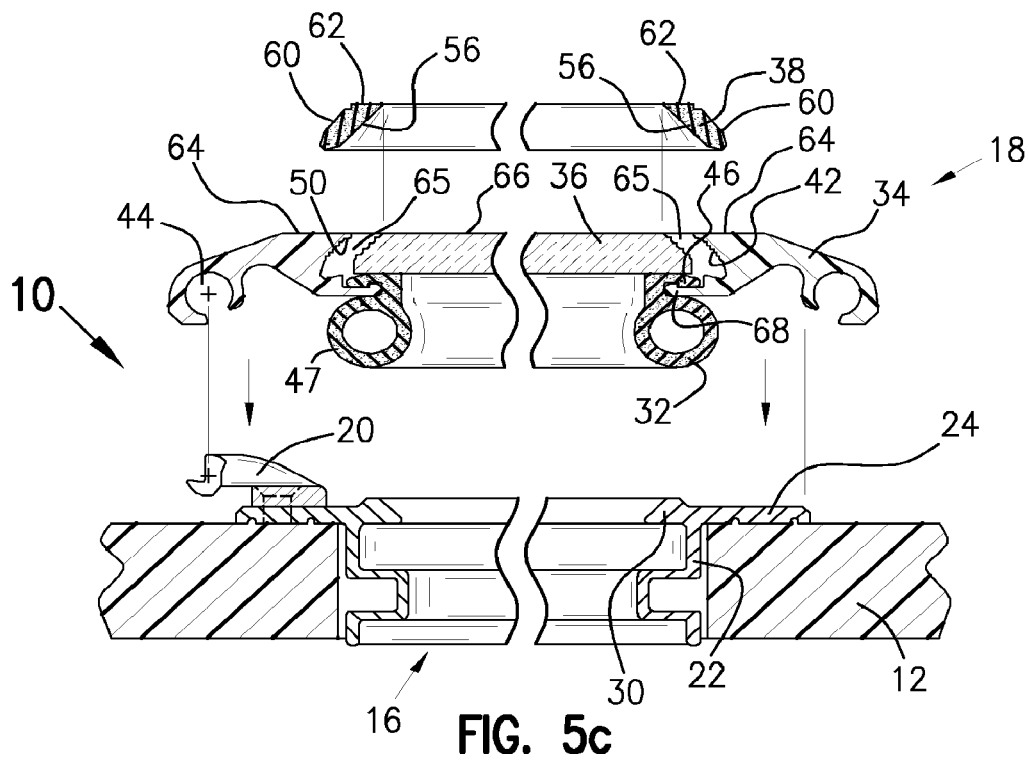
Figure 5D:
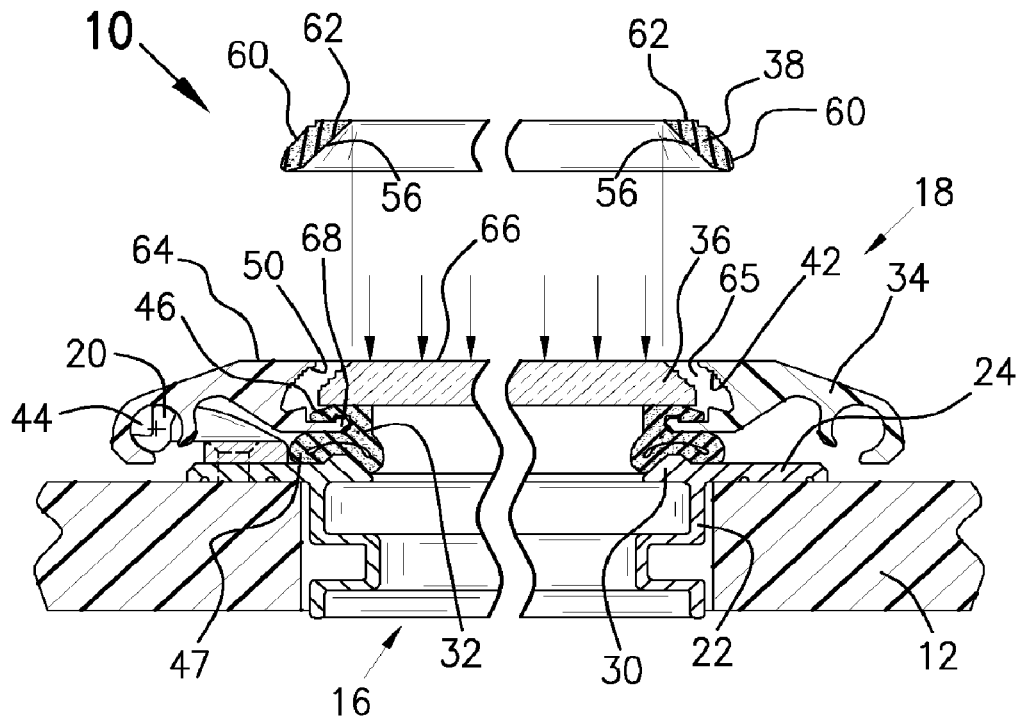
Figure 5E:
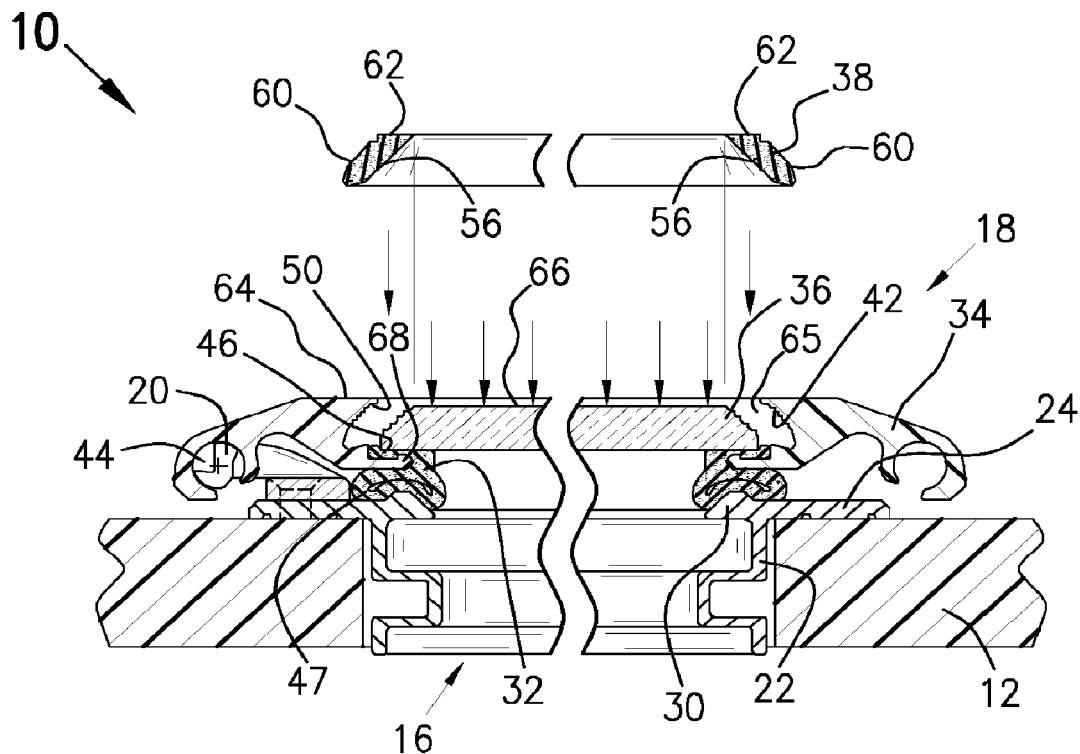
Figure 5F:
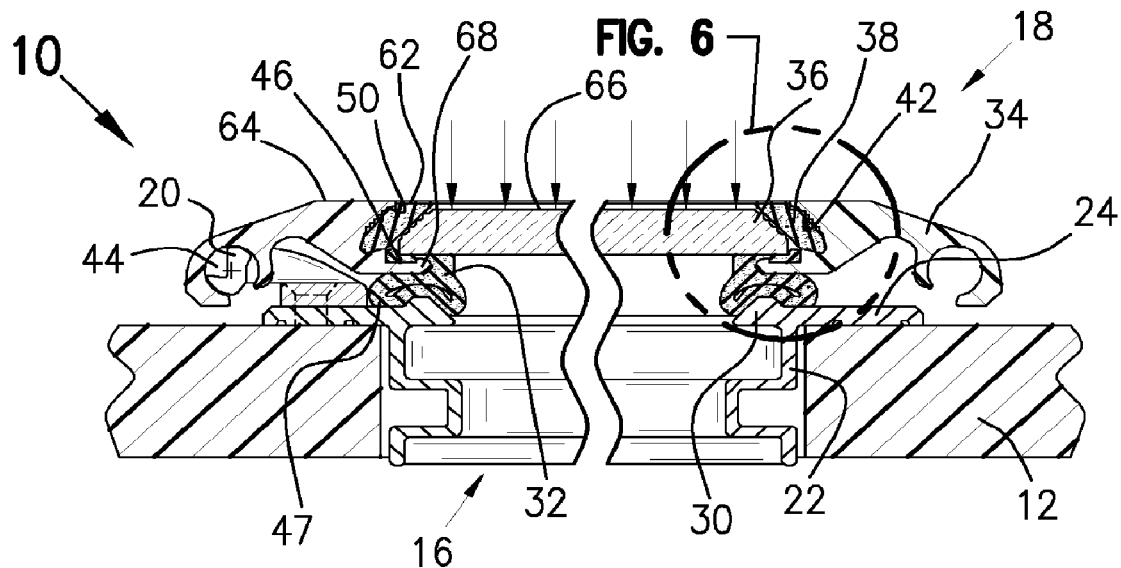
Figure 5G:
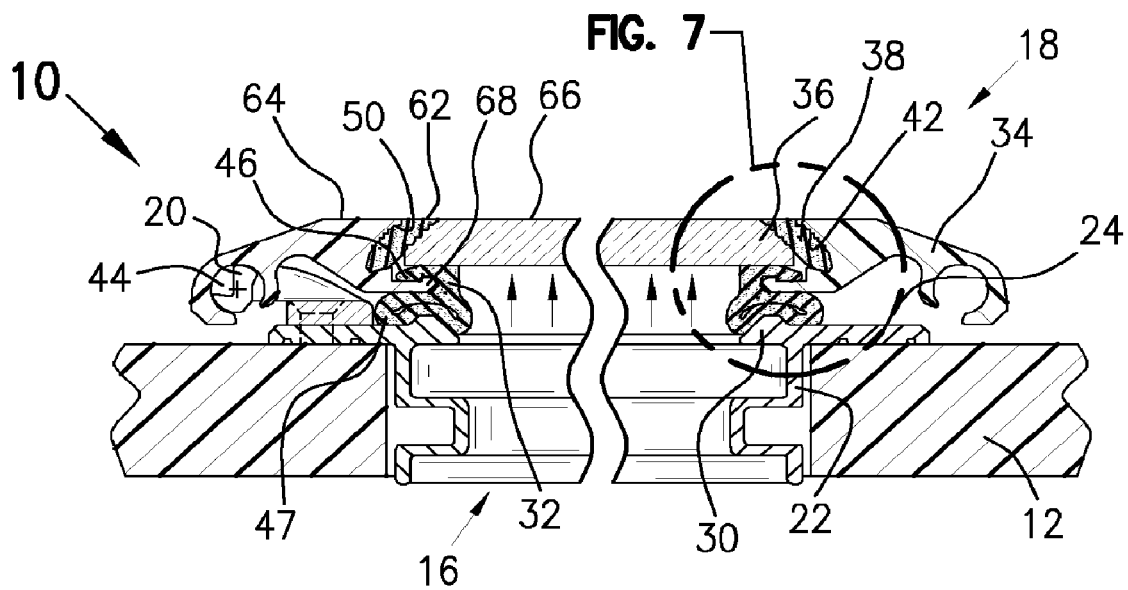
Figure 6:
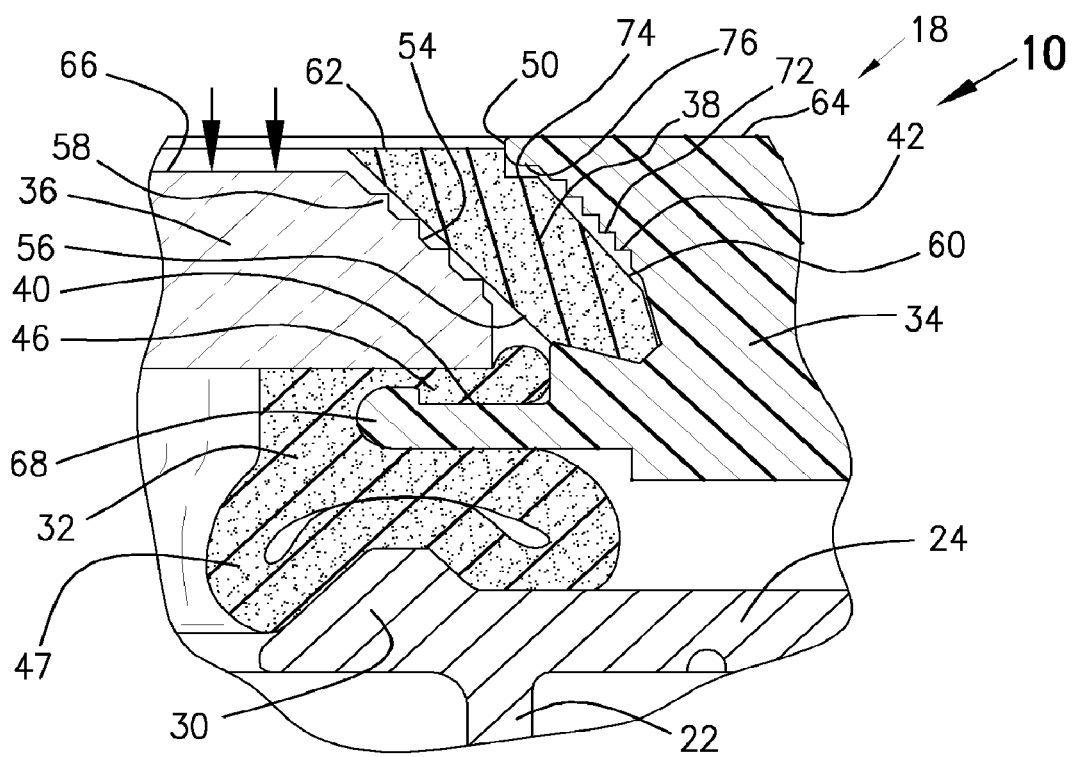

Referring now to the figures, FIG. 1 broadly illustrates hatch 10 according to the present invention secured to deck 12 of sailboat 14. As illustrated in FIGS. 2–6, hatch 10 generally comprises hatch base assembly 16 and hatch lid assembly 18, which are pivotally joined to one another by one or more hinge assemblies 20, such as a type described in U.S. Pat. Nos. 5,676,082 and 6,186,357, which patents are incorporated herein by reference in their entireties.

Hatch base assembly 16 generally comprises an integral, one-piece ringed structure forming an opening which allows ingress and egress from one area to another. Hatch base assembly 16 broadly comprises spigot 22 and flange 24. Spigot 22 generally comprises that portion of the hatch base assembly that is received within a cut-out of a deck, or wall. Flange 24, which is illustrated as being generally perpendicularly disposed with respect to spigot 22, extends about the spigot and can comprise through-bores for receiving fasteners to secure the hatch base assembly to a deck or wall. The through-bores may also be configured for securing hinge assembly 20 components. Proximate the junction of spigot 22 and flange 24 is lipped portion 30, which is adapted for releasably receiving hatch sealing gasket 32, which can comprise a foam rubber gasket. An end of a standard hatch adjuster or riser arm (not shown) may be secured to the hatch base assembly 16 such that the hatch lid assembly may be maintained in an open position, if desired. Alternatively, a hatch adjuster of a type described in U.S. Pat. No. 6,105,529, which patent is incorporated herein by reference, may be employed. In one aspect, the hatch base is fabricated from extruded aluminum, but other appropriate materials may be utilized.

Figure 7:
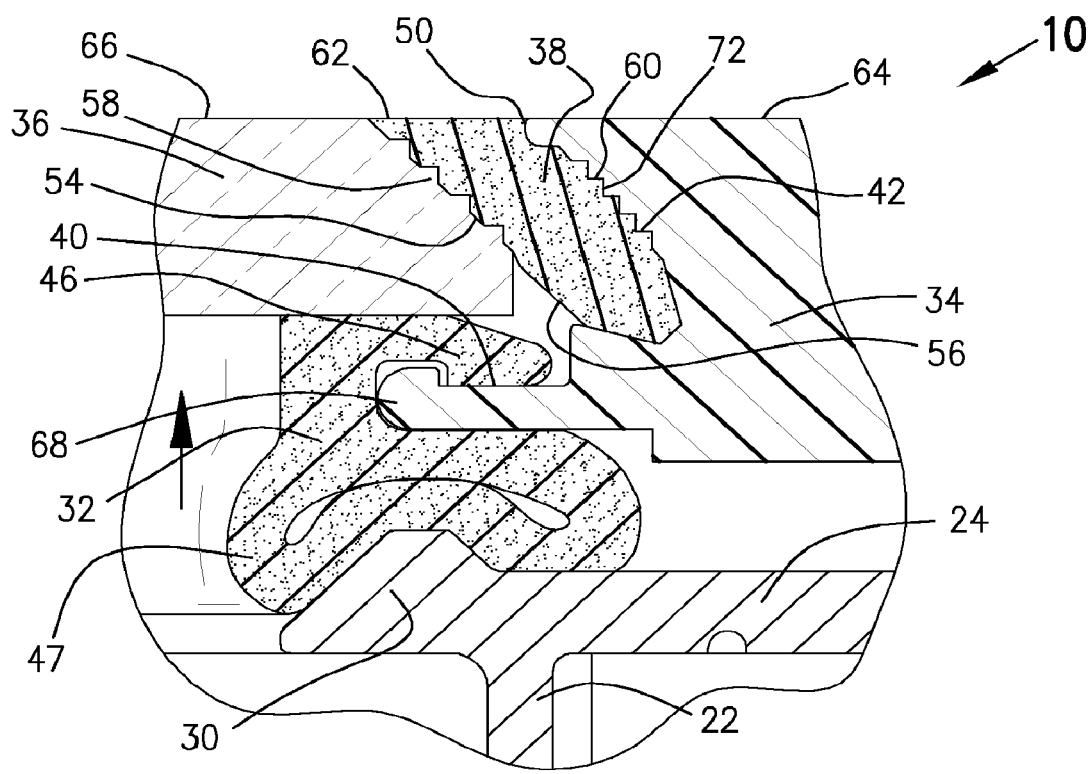

Hatch lid assembly 18 generally comprises hatch lid frame 34, lens 36, lens gasket 38 and hatch sealing gasket 32. Hatch lid frame 34 comprises an integral, one-piece ringed structure, which defines opening 48, and is, preferably, formed from extruded aluminum. Opening 48 defines perimeter 50 and is adapted for receiving lens 36 therethrough. Hatch lid frame 34 comprises hatch sealing gasket channel 40 for securing hatch sealing gasket 32 thereto, lens gasket channel 42 for receiving and securing lens gasket 38 thereto, and channel 44, which can receive components of hinge assemblies 20. Each of hatch sealing gasket channel 40, lens gasket channel 42, and channel 44 extend about the hatch lid frame opening and/or are concentric therewith. Hatch sealing gasket channel 40 is generally configured for receiving and securing hatch sealing gasket 32 therein, which can comprise a weather resistant elastomeric material such as foam rubber, or other appropriate material. Hatch sealing gasket channel 40, along with associated hooked abutment portion 68 defines a perimeter which, in the embodiment illustrated, is smaller than the perimeter of hatch lens 36. Thus, the hatch lens is configured to rest upon hatch sealing gasket 32 when it is disposed through opening 48. Hooked abutment portion 68 is provided for receiving locking flange portion 46 of hatch sealing gasket 32. Lens gasket channel 42 is disposed about the hatch lid frame and is adapted for receiving lens gasket 38 therein such that the lens may be substantially flush mounted within the hatch lid frame 14. As illustrated more clearly in FIGS. 6 and 7, portions of lens gasket channel 42 generally correspond with the shape of, and can be parallel with, side 60 of lens gasket 38 and sides 54 of the lens such that the lens gasket may be inserted and wedged between the lens and the lens gasket channel. Lens gasket channel 42 may also be configured to comprise friction structures 72 for gripping and retaining the lens gasket within the lens gasket channel. Friction structures 72 can extend along the length and height of the lens gasket channel. In the embodiment illustrated, the friction structures comprise a plurality of tooth-like structures, which form a serrated surface; other structures may be utilized for properly seating and securing the lens and lens gasket to the hatch lid frame, for example, barbed structures or recesses therefor, may be utilized. As discussed, supra, channel 44 is generally provided for receiving components of hinge assemblies 20.

Hatch sealing gasket 32 is generally provided for sealing the hatch lid assembly 18 with respect to the hatch base assembly 16. Hatch sealing gasket 32 generally comprises locking flange portion 46, which is adapted for locking mate with hatch sealing gasket channel 40 of the hatch lid fame. Hatch sealing gasket 32 also comprises compressible portion 47, which in the embodiment illustrated, comprises a hollow core, which allows the hatch sealing gasket to be compressed upon lipped portion 30 of hatch base assembly 16 when it is closed. Hatch sealing gasket can be formed from foamed rubber or other compressible material appropriate for forming a seal between the hatch lid assembly and hatch base assembly.

Lens 36 defines perimeter 52, which has a shape that substantially corresponds with the shape of the lens gasket and the lens gasket channel. The perimeter of the lens is, preferably, configured to be only slightly smaller than the perimeter of opening 48 such that the lens may be inserted within the hatch lid frame opening and rested upon locking flange portion 46 of hatch sealing gasket 32. Sides 54 of lens 36 are configured for substantial complementary mating fit with inner sides 56 of lens gasket 38. Sides 54 of the lens and inner side 56 of the lens gasket, preferably, comprise substantially complementary surfaces, but can be shaped otherwise. In the embodiment illustrated, sides 54 of the lens are beveled and, as more clearly illustrated in FIGS. 6–9, comprise friction structures 58, which are illustrated as tooth-like structures, which form a serrated edge. Alternatively, barbed structures or recesses therefor, may be utilized. Friction structures 58 are configured to grip inner side 56 of lens gasket 38 to secure the lens and lens gasket in place when the hatch lid assembly is assembled. Lens 36 can be translucent, transparent or opaque and can be formed from an impact resistant polymer, such as acrylic or Lucite, or glass.

Lens gasket 38 is provided for securing and sealing lens 36 to hatch lid frame 34. Lens gasket can be fabricated from a flexible polymer, e.g., a UV resistant polymer such as silicone, which may be extruded, and generally comprises inner side 56, outer side 60 and top side 62. As discussed, supra, inner side 56 is configured for substantial complementary mating fit with side 54 of the lens. Outer side 60 is configured for substantial complementary mating fit with lens gasket channel 42. Top side 62 is configured for substantial flush mounted fit with top surface 64 of the hatch lid frame and top surface 66 of lens 36 when such components are assembled. The cross-sectional shape of lens gasket 38 generally corresponds with the cross-sectional shape of space 65, which is formed between the perimeter of lens 36 and the perimeter of lens gasket channel 42 when the lens is placed within opening 48 and rested upon the hatch sealing gasket channel. The cross-sectional area of lens gasket 38, however, can be slightly larger than that of space 65. Lens gasket 38 can comprise notch 74 for receiving abutment 76 of lens gasket channel 42 such that the lens gasket may be secured within space 65 and maintain substantially flush mount with the top surface of the hatch lid frame and lens. Appropriate adhesives may also be utilized to secure the lens gasket within space 65. The lens gasket may also be configured to comprise barbed structures configured to mate with complementary lens 36 or lens gasket channel 42 surfaces such that the lens gasket 38 is appropriately set within space 65.

As illustrated more clearly in FIGS. 5a-7, a method of assembling a hatch lid according to the invention generally comprises securing the hatch sealing gasket to the hatch lid frame, resting the lens upon the hatch sealing gasket, applying a force upon the lens, inserting the lens gasket within the space between the lens and the hatch lid frame, and de-asserting the force applied upon the lens. It is generally desirable to apply a force upon the lens prior to inserting the lens gasket because the size and/or shape of the lens gasket can make it difficult to insert the lens gasket into the space. Consequently, as illustrated in FIGS. 5d-7, the cross-sectional area of space 65 can be enlarged prior to insertion by applying a force upon lens 36 in the direction of the arrows. Application of this force compresses locking flange portion 46 of the hatch sealing gasket. Once space 65 is sufficiently enlarged, lens gasket 38 can be inserted therein and the force applied to the lens de-asserted. Removing the force applied upon the lens causes the locking flange portion 46 of the hatch sealing gasket to begin to return to a resting state. Upon returning to its resting state, the hatch sealing gasket applies a force upon lens 36 in the direction of the arrow in FIG. 7. The force applied upon the lens asserts a force upon the lens gasket to sealably mate the lens, lens gasket 38, and lens gasket channel 42. It should be appreciated that while the shape of the lens, lens gasket 38 and lens gasket channel 42 are configured to form a substantially flush interface on their top surfaces on their own, friction structures 58, 72 and abutment 76 and notch 74 can assist to ensure and maintain a proper flush mount. Alternatively, the hatch lid may be assembled by placing the hatch lid frame on its top surface, inserting the lens gasket, inserting the lens, and then inserting the hatch sealing gasket. Another method of assembling the hatch lid includes placing the hatch lid on its bottom surface, inserting the lens, inserting the lens sealing gasket between the lens and lens frame, rotating the assembly, and inserting the hatch sealing gasket.

Figure 8:
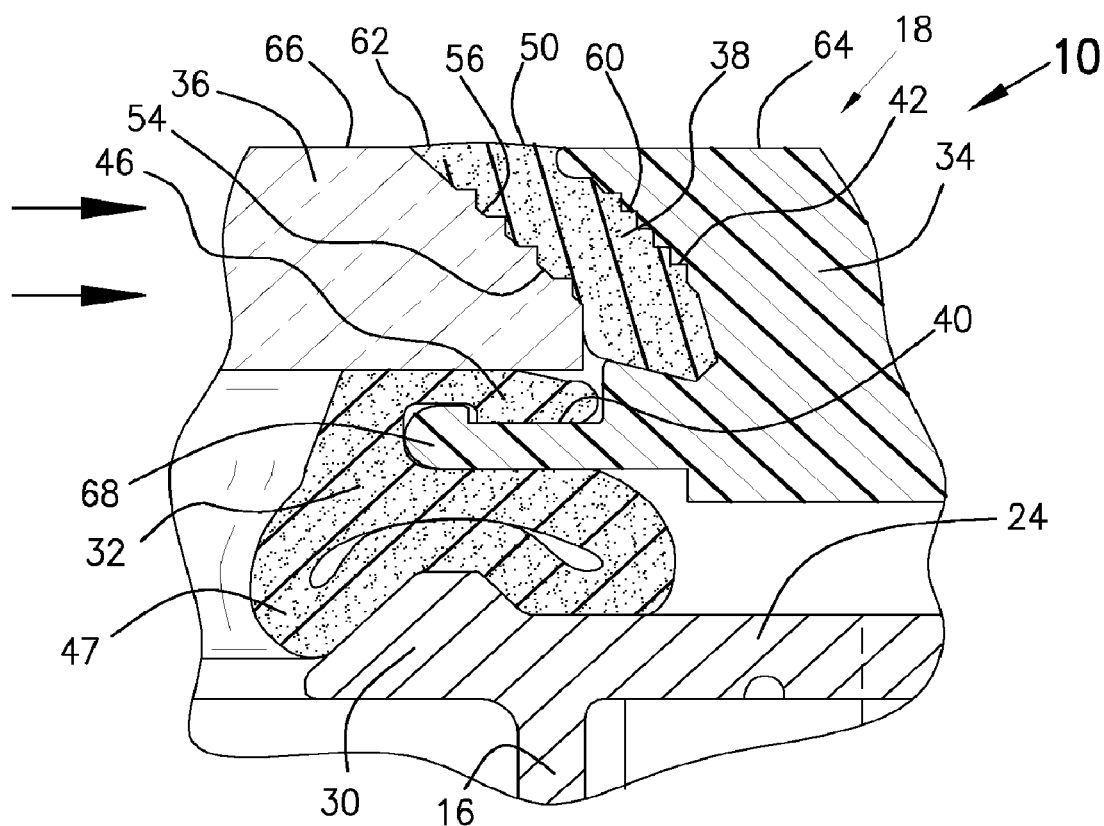
Figure 9:
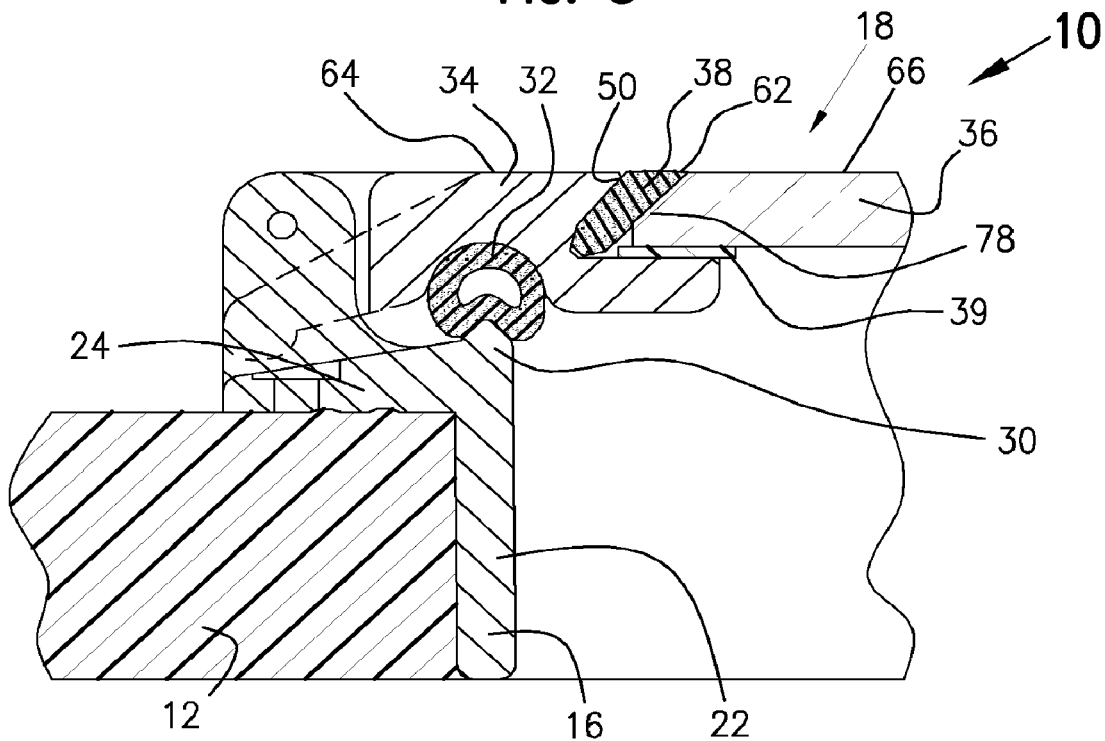

Furthermore, as illustrated in FIG. 8 (which is an exaggerated view for purpose of illustration), when the lens is exposed to heat, e.g., sunlight, it tends to expand, which can apply a force upon the lens gasket in the direction of the arrows. This additional force upon the lens gasket can cause the lens gasket to further wedge itself within space 65 and down along the sides of the lens. This ultimately forms a tighter seal between the lens and the hatch frame. Finally, as illustrated in FIG. 9, the invention can comprise a plurality of gaskets, e.g., hatch sealing gasket 32 and separate lens gaskets 38 and 39 and/or may utilize appropriate adhesives 78, e.g., silicone, alone or in combination with friction structures (teeth, barbed structures, etc.) to secure the gaskets to the lens and/or hatch lid channel.

Thus, it is seen that the aspects of the present invention are efficiently obtained, although modifications and changes to the invention should be readily apparent to those having ordinary skill in the art, which modifications are intended to be within the spirit and scope of the invention as claimed.

What is claimed is:

1. A hatch comprising:
   a hatch lid frame comprising a fixed opening defining a perimeter;
   a lens comprising a lens perimeter having a beveled edge, said lens perimeter smaller than said opening perimeter such that said lens is insertable into said opening, and
   a gasket disposed between said hatch lid frame and said lens, said lens asserting a force upon gasket to sealably secure said lens within said hatch lid frame.

2. The hatch of claim 1 wherein said gasket is a lens sealing gasket.

3. The hatch of claim 1 wherein said gasket is a hatch sealing gasket.

4. A hatch comprising
   a hatch lid frame comprising a fixed opening defining a perimeter;
   a lens comprising a lens perimeter smaller than said perimeter opening such that said lens is insertable into said fixed opening, and
   a lens sealing gasket disposed between said hatch lid frame and said lens, said lens asserting a force upon said lens sealing gasket to sealably secure said lens within said hatch lid frame, wherein a top surface of said lens, a top surface of said lens sealing gasket and a top surface of said hatch lid frame are substantially flush with one another.

5. The hatch of claim 3 wherein said hatch lid frame comprises a channel for receiving said lens sealing gasket therein.

6. A hatch comprising
   a hatch lid frame comprising a fixed opening defining a perimeter, a lens sealing gasket and a channel for receiving said lens sealing gasket therein;
   a lens comprising a lens perimeter smaller than said opening perimeter such that said lens is insertable into said fixed opening, and
   a hatch sealing gasket disposed between a hatch base assembly and said lens, said lens asserting a force upon said lens sealing gasket to sealably secure said lens within said hatch lid frame, wherein a surface of said lens is beveled and said lens sealing gasket is wedged between said lens and said channel by a force applied upon said lens.

7. The hatch of claim 4 wherein said channel and said surface of said lens comprise friction structures for securing said lens sealing gasket.

8. A method of securing a lens within a hatch lid frame comprising the steps of:
   inserting a lens having a beveled edge into an opening of a hatch lid frame having an edge complimentary to said beveled edge of said lens;
   asserting a force upon said lens to direct said lens in a direction to form a gap between the beveled edge of said lens and said edge of said hatch lid frame;
   inserting a gasket in said gap; and,
   releasing said force applied to said lens to sealably secure said lens in said hatch lid frame.

9. The method of claim 8 wherein said gasket comprises a lens sealing gasket.

10. The method of claim 9 further comprising the step of applying adhesive between said gasket and said lens.

11. The method of claim 9 further comprising the step of applying adhesive between said lens and said edge of said hatch lid frame.

12. A method of securing a lens within a hatch lid frame comprising the steps of:
   inserting a first gasket into an opening of said hatch lid frame such that it abuts said hatch lid frame;
   inserting a lens comprising a beveled edge into the opening of said hatch lid frame such that said lens abuts said first gasket on a first side, said hatch lid frame comprising a perimeter with an edge complimentary to the beveled edge of said lens, and
   inserting a second gasket between another side of said lens and said hatch lid frame.

13. The method of claim 12, wherein said first gasket comprises a lens sealing gasket, or alternatively, a hatch sealing gasket.

14. The method of claim 12, wherein said second gasket comprises a lens sealing gasket, or alternatively, a hatch sealing gasket.

15. The method of claim 12, comprising the step of applying an adhesive to a surface of said first gasket.

16. The method of claim 12, comprising the step of applying an adhesive to a surface of said second gasket.

17. The method of claim 12 wherein said lens is wedged within said hatch lid frame by means of said first gasket and said second gasket.

18. A hatch comprising
a hatch lid frame comprising a fixed opening defining a perimeter, a lens sealing gasket and a channel for receiving said lens sealing gasket therein;
a lens comprising a lens perimeter smaller than said opening perimeter such that said lens is insertable into said fixed opening, and
a hatch sealing gasket disposed between a hatch base assembly and said lens, said lens asserting a force upon said lens sealing gasket to sealably secure said lens within said hatch lid frame, wherein a surface of said channel, a surface of said lens and a surface of said lens sealing gasket are parallel with one another.

19. A hatch comprising
a hatch lid frame comprising a fixed opening defining a perimeter;
a lens comprising a lens perimeter smaller than said opening perimeter such that said lens is insertable into said fixed opening, and
a lens sealing gasket disposed between said hatch lid frame and said lens, said lens asserting a force upon said lens sealing gasket to sealably secure said lens within said hatch lid frame, wherein said lens is wedged within said hatch lid frame by means of said lens sealing gasket and a hatch sealing gasket.

20. The hatch of claim 1, wherein the perimeter of said fixed opening of the hatch lid frame comprises an edge substantially complimentary to the beveled edge of said lens perimeter.

21. A hatch comprising:
a hatch lid frame comprising a fixed opening with an edge defining a perimeter;
a lens comprising an edge defining a perimeter smaller than said fixed opening of said hatch lid frame perimeter such that said lens is insertable into said opening, the edge of said fixed opening of said hatch lid frame and the edge of said lens forming a gap therebetween, and
a gasket disposed in said gap, wherein the edges of said hatch lid frame and said lens are operatively arranged so the gap is enlarged with compression of the lens and narrowed with release of said compression to sealably secure said gasket and lens within said hatch lid frame.

* * * * *